(12) United States Patent
Oelscher

(10) Patent No.: US 10,166,626 B2
(45) Date of Patent: Jan. 1, 2019

(54) METHOD FOR THE NON-RELEASABLE CONNECTION OF COMPONENTS OR COMPONENT REGIONS AND NON-RELEASABLE CONNECTION

(71) Applicant: FORD GLOBAL TECHNOLOGIES, LLC, Dearborn, MI (US)

(72) Inventor: Michael Oelscher, Bergheim NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 14/902,250

(22) PCT Filed: Jun. 26, 2014

(86) PCT No.: PCT/EP2014/063583
§ 371 (c)(1),
(2) Date: Dec. 30, 2015

(87) PCT Pub. No.: WO2015/000794
PCT Pub. Date: Jan. 8, 2015

(65) Prior Publication Data
US 2016/0368079 A1    Dec. 22, 2016

(30) Foreign Application Priority Data
Jul. 4, 2013    (DE) .......................... 10 2013 213 109

(51) Int. Cl.
*B23K 11/11*    (2006.01)
*B23K 11/14*    (2006.01)
*C09J 5/00*    (2006.01)
*B23K 11/34*    (2006.01)

(52) U.S. Cl.
CPC .............. *B23K 11/11* (2013.01); *B23K 11/14* (2013.01); *B23K 11/34* (2013.01); *C09J 5/00* (2013.01); *C09J 2400/163* (2013.01)

(58) Field of Classification Search
CPC ......... B23K 11/11; B23K 11/14; B23K 11/34; C09J 5/00; C09J 2400/163; Y10T 403/477; Y10T 403/478; Y10T 403/479
(Continued)

(56) References Cited

U.S. PATENT DOCUMENTS

| 5,049,274 A * | 9/1991 | Leason | B01D 35/0273 156/73.1 |
| 2014/0079908 A1 * | 3/2014 | Kato | B32B 3/06 428/140 |
| 2014/0339853 A1 * | 11/2014 | Sato | B60J 5/0402 296/146.5 |

FOREIGN PATENT DOCUMENTS

| DE | 3326612 | 9/1984 |
| DE | 4431991 | 3/1996 |

(Continued)

OTHER PUBLICATIONS

Machine Translation of JP2012-000652A (Year: 2012).*
(Continued)

*Primary Examiner* — Daniel McNally
(74) *Attorney, Agent, or Firm* — Marla Johnston; Brooks Kushman P.C.

(57) ABSTRACT

A method for the connection of components or component regions and a non-releasable connection produced in this manner. Two connection faces are partially welded to each other with an adhesive layer being incorporated between the two connection faces. The method including the following steps: arranging a welding base on a connection face, applying the adhesive layer to a connection face, moving the connection faces toward each other in such a manner that the welding base is applied against the other connection face, introducing welding current in the region of the applied welding base. A spacer is arranged between the connection faces before the connection faces are moved toward each
(Continued)

other. The connection faces are spaced apart from each other in the region of the welding base by the extent that the welding base projects above the spacer.

7 Claims, 5 Drawing Sheets

(58) Field of Classification Search
USPC .................................................. 403/270–272
See application file for complete search history.

(56) References Cited

FOREIGN PATENT DOCUMENTS

| DE | 102010049865 | | 5/2012 | | |
|----|----|----|----|----|----|
| EP | 1679147 | | 7/2006 | | |
| JP | 2000334573 | A | 12/2000 | | |
| JP | 2012000652 | A * | 1/2012 | | |
| JP | 2012000652 | A | 1/2012 | | |
| WO | WO-2012161348 | A1 * | 11/2012 | ............... | B32B 3/06 |
| WO | 2013084801 | A1 | 6/2013 | | |
| WO | WO-2013084801 | A1 * | 6/2013 | ............ | B60J 5/0402 |

OTHER PUBLICATIONS

European Patent Office, International Search Report for the corresponding International Application No. PCT/EP2014/063583 dated Nov. 19, 2014.

\* cited by examiner

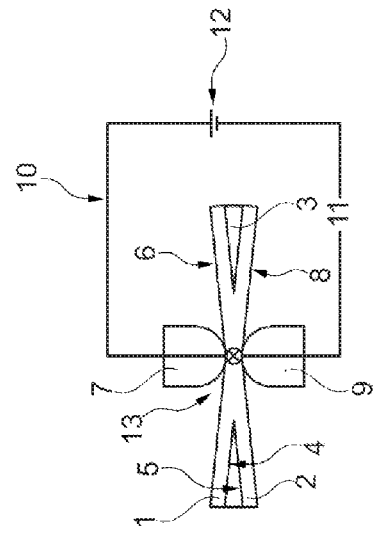
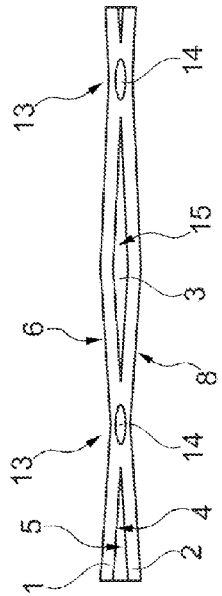
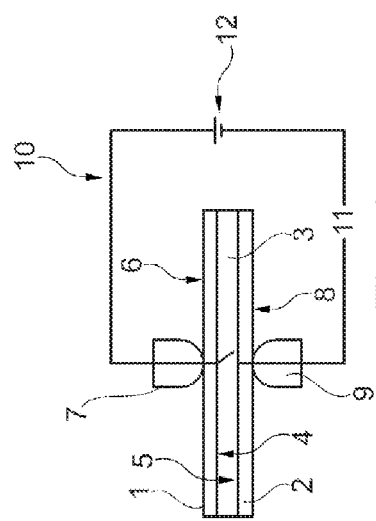
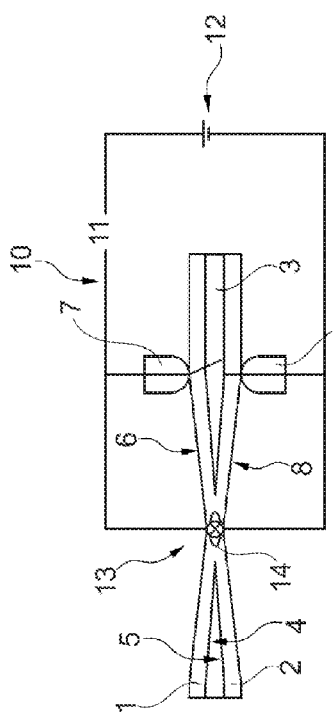

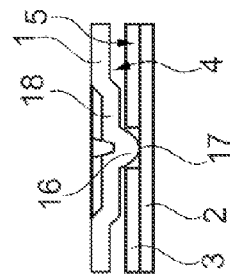
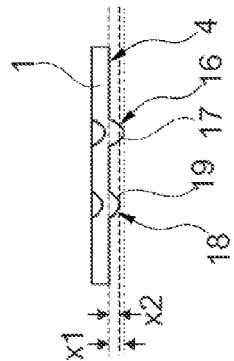
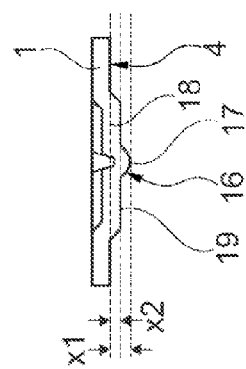
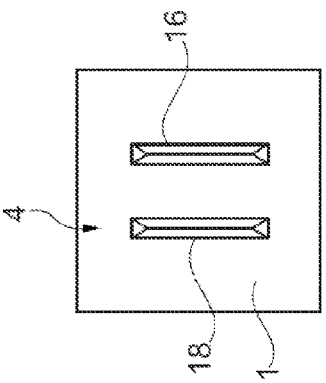
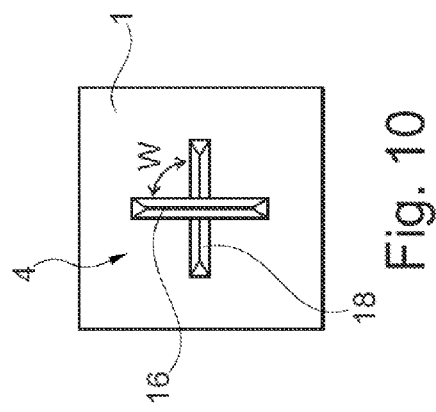
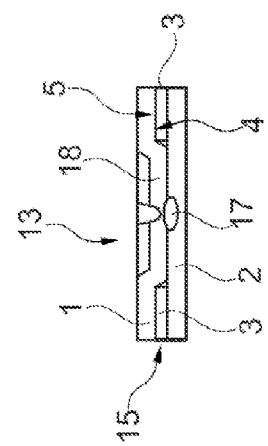

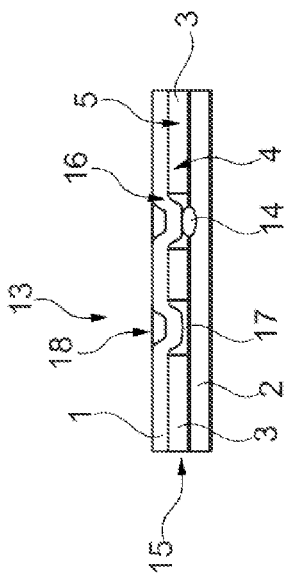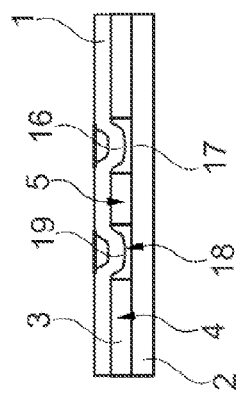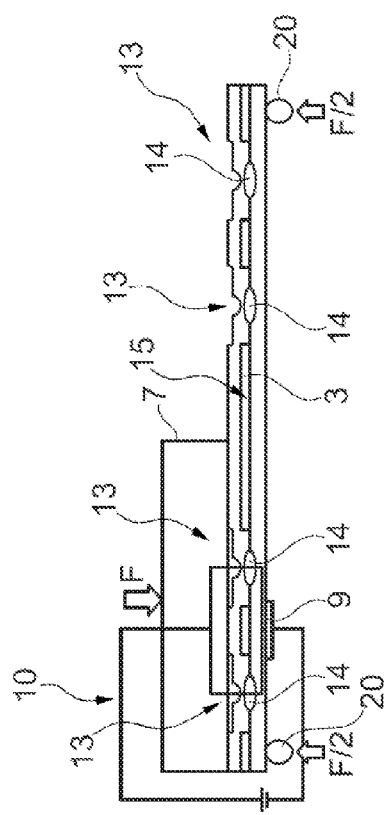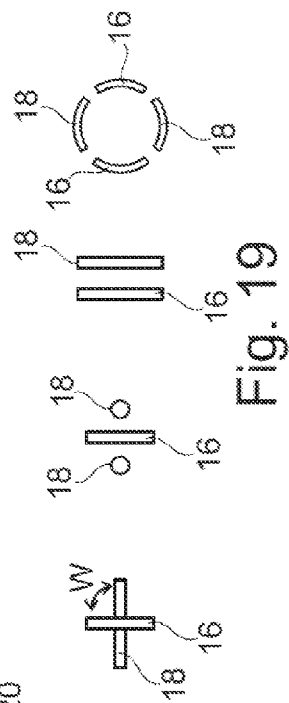

METHOD FOR THE NON-RELEASABLE CONNECTION OF COMPONENTS OR COMPONENT REGIONS AND NON-RELEASABLE CONNECTION

CROSS-REFERENCE TO RELATED APPLICATIONS

This application is the U.S. national phase of PCT Application No. PCT/EP2014/063583 filed on Jun. 26, 2014, which claims priority to German Application No. DE 102013213109.7 filed on Jul. 4, 2013, the disclosures of which are incorporated in their entirety by reference herein.

TECHNICAL FIELD

The present invention relates to a method for the non-releasable connection of components or component regions and a non-releasable connection.

BACKGROUND

Welding or bonding connections are used for the non-releasable connection of at least two components or component regions of an individual component. The objective is a permanent connection by means of the materially engaging joining thereof. In welding connections, the base material is initially partially molten by welding heat. The actual connection is formed only as a result of subsequent cooling when the molten phase is left. In principle, consequently, all materials which can be converted into a molten phase can be welded to each other. The material engagement can be brought about with or without a suitable welding filler in accordance with the welding method used.

In order to obtain the necessary welding heat, energy must be supplied from the outer side. In addition to the movement energy which is intended to be applied for this purpose during friction welding, this energy may also be produced, for example, by means of a suitable heat source. However, when metal materials are welded, the electrical resistance thereof can be used to obtain local heating directly as a result of welding current being introduced. Resistance spot welding has become established in particular in the case of thin-walled elements such as, for example, bodywork components. Welding is carried outusing welding tongs engaged around the metal sheets or metal sheet regions intended to be connected. The metal sheets, are locally pressed against each other by electrodes from opposite sides until an electrically conductive contact is produced between the regions to be welded. Subsequently, the welding current flows via the electrodes through the local contact region to form a welded connection.

In addition to the materially engaging connection of component faces by means of welding, purely bonding methods are also used in many cases. The bonding layer present between the component faces produces a non-releasable bonding connection.

SUMMARY

In this regard, DE 44 31 991 A1 describes a method for connecting planar components. The components which are intended to be connected may comprise materials which are identical to or different from each other. In particular, iron-containing and non-iron-containing materials may be involved. The actual connection is achieved by the prior application of an adhesive which hardens under the action of heat. To this end, the adhesive is applied extensively on at least one abutment face of the components to be connected. Subsequently, the components are placed on each other with the abutment faces thereof. In the first step, only a point-like bonding connection is brought about between the components. To this end, only part-regions of the abutment faces provided with adhesive are initially heated. In this manner, the adhesive is locally hardened in order to obtain between the components a connection or fixing which is sufficiently durable at first. Subsequently, the components are supplied to a longer operation of heat in order to harden the remaining adhesive up to the final strength of the connection. In this manner, preliminary fixing of the components to be connected is possible as quickly as possible, while the concluding, extensive solidification is brought about in a subsequent process. Thus, for example, the concluding heat operation can be carried out in the context of hardening an applied lacquer in a hardening oven. A correspondingly efficient use of the necessary time and energy is thereby produced.

On the basis of conventional resistance spot welding, the use of an additional adhesive layer between the component regions to be connected is also known. An additional materially engaging connection between the component regions is provided by means of the adhesive layer. The advantage of this method which is referred to as adhesive welding involves the production of a highly durable connection. This is particularly because the connection face which is used for force transmission can thereby expand beyond the welding region up to the size of the adhesive layer.

The problems known in connection with adhesive welding involve the production of the welding connection itself. For instance, the adhesive layer initially constitutes an initial impediment in order to produce an adequate, electrically conductive contact between the abutting faces of the component regions to be connected. This is because inter alia, for example, the adhesive used in the automotive industry is non-conductive. Consequently, the adhesive layer in the connection region to be welded together has to be either recessed or displaced. Since highly viscous and consequently thick-flowing adhesives are involved in this instance, correspondingly high forces are necessary in order to press the component regions to be connected against each other with the adhesive being displaced. Since the pressing forces necessary for this are applied via electrodes, the electrodes have a correspondingly high degree of wear. Furthermore, high pressing forces are particularly unsuitable if they have to be applied from only one side without an adequate counter-bearing.

Ultimately, an inadequate displacement of the adhesive results in undesirable welding defects. Furthermore, many of the adhesives used can be locally displaced only using an additional auxiliary connection circuit. This is used for the temporary preheating of the adhesive in order to reduce the viscosity thereof. However, the process reliability of the adhesive welding is reduced by the use of an additional auxiliary connection circuit. The adhesive gap produced in this manner is non-uniform as a result of the changes typical in adhesive welding between regions which are bonded and welded to each other. Furthermore, the adhesive gap does not have in the welding regions any more spacing between the component regions connected to each other. Consequently, the thickness of the adhesive layer varies over the connection face. Consequently, the adhesive gap cannot generally be adjusted.

In order to achieve adjustability of the adhesive gap, the projection welding method is further known. In this instance, the contact necessary for welding between the component faces to be connected is produced by means of so-called welding projections. A welding projection is usually a deformation which is pressed into at least one thin-walled component. While an indentation is thereby produced at one side of the component, the opposite side has the necessary protrusion in the form of a projection. The component faces fabricated in this manner are also welded by means of electrodes. These electrodes may be a component of welding tongs, as also used in conventional resistance spot welding or adhesive welding.

As a result of the contact face size which is predetermined by means of the welding projection, the electrical current density which can thus be achieved is not dependent on the size of the electrodes. In other words, electrodes which taper so as to be thin and which consequently wear quickly must not be used in this instance in order to obtain a limited contact region. Consequently, it is possible in the projection welding method to use planar electrodes which have correspondingly less electrode wear. In this context, there are known methods which combine the said projection welding method with the use of an adhesive layer.

In this regard, DE 33 26 612 A1 describes a method for connecting two metal plates by means of a resistance spot weld. Before the actual welding, a projection-like deformation is first pressed into a first plate. The projection is provided in order to produce the electrically conductive contact necessary for welding with respect to a second plate. In order to improve the connection to be produced, at least one of the two plates is provided with an adhesive layer in the deformation region. The adhesive layer is applied at the side of the plate that has a protrusion in the deformation region. Subsequently, the first plate having the protrusion thereof is placed against an abutment region of the second plate and pressed into the adhesive layer and the second plate. By electrodes being applied in the deformation region, a welding current which flows from one plate through the protrusion into the other plate is finally applied to the plates. As a result, the metal of the plates is locally molten in the deformation region, whereby a materially engaging connection is produced. Consequently, the material engagement comprises the welding connection and the adhesive connection.

The combination of the projection welding method with the arrangement of an adhesive layer already affords many advantages. As a result of the present formation of the welding projection, the adhesive layer can be displaced locally substantially more easily because the pressing force which can be introduced via the electrodes is distributed over a surface-area which is only small. The high compressive strain which can be achieved in this manner under the welding projection again results in the necessary pressing force generally being able to be reduced. An improved electrically conductive contact can be achieved as a result of the simple local displaceability of the adhesive layer. Furthermore, the arrangement of an auxiliary connection circuit which is sometimes necessary is dispensed with so that the process reliability is generally increased.

Nevertheless, the extent of the adhesive gap also cannot be adjusted in this instance. Thus, the melting process during the welding operation first starts at the tip of the weld projection and initiates the growth of a weld nugget. In this instance, the welding projection is completely converted into the molten phase. As a result, the initial protrusion of the welding projection is compressed after the welding and is consequently no longer available. Furthermore, the component faces which are connected to each other are also thereby located flat on each other.

Consequently, the known welding methods and the welding connections which can be produced therewith certainly still leave room for improvement.

Against this background, an object of the present invention is to improve a method for the non-releasable connection of components or component regions so that a combined connection of welding and bonding can be achieved in a process-reliable manner, wherein the necessary adhesive gap can be adjusted. Furthermore, there is intended to be set out an improved non-releasable connection which comprises a combination of welding and bonding, wherein the necessary adhesive gap is also formed in the region of the welding.

The solution to the method-related portion of this object is set out in the method having the features of claim 1. The device-related portion of this object is solved by the features of claim 6. Additional, particularly advantageous embodiments of the invention are disclosed in the dependent claims.

It should be noted that the features set out individually in the following description can be combined with each other in any technically advantageous manner and set out additional embodiments of the invention. The description further characterizes and specifies the invention in particular with reference to the Figures.

As a result of the method according to the invention for the non-releasable connection of components or component regions, two connection faces are at least partially welded to each other with an adhesive layer being incorporated. In this regard, the following steps are envisaged:

arranging a welding base on a connection face, applying the adhesive layer to a connection face, moving the connection faces toward each other, wherein the welding base is applied against the other connection face and introducing welding current in the region of the applied welding base.

It should be mentioned that the arrangement of the at least one welding base can be carried out both before and after the adhesive layer is applied. Accordingly, the application of the adhesive layer can be carried out before or after the at least one welding base has been arranged. Naturally, it is also conceivable to carry this out in a parallel manner by simultaneously arranging the welding base and applying the adhesive layer. Preferably, the application of the adhesive layer is carried out only after the at least one welding base has been arranged on one of the connection faces.

In relation to the envisaged construction of the connection, the welding base and adhesive layer can be arranged and applied together on one and the same connection face. However, the at least one welding base may be arranged on a first connection face while the adhesive layer is applied to a second connection face and consequently to the respective other connection face. The adhesive layer and welding base are preferably arranged on different connection faces. The approach movement of the two connection faces prefabricated in this manner is thereby carried out in such a manner that the welding base is applied against the other connection face with the adhesive layer being displaced locally, respectively. The abutment of the welding base against the opposite connection face serves to produce an electrically conductive contact in order even to be able to carry out the resistance welding used with the introduction of welding current.

According to the invention, before the connection faces which are intended to be connected to each other in a non-releasable manner are moved toward each other, a spacer is arranged therebetween. In this instance, it should be noted that the welding base projects above the spacer. In other words, the extent of the spacer extending between the mutually approached connection faces should be selected in such a manner that a spacing remains between the spacer and at least one connection face when the welding base is already in the applied state.

In this instance, the particular advantage involves the additional arrangement of the spacer. The remaining spacing between the connection faces which are positioned on each other and which are pressed against each other during the welding operation in the region of the welding base can thereby be controlled. In known manner, the melting process of the welding base also starts here initially at the tip thereof, which melting process begins by the welding current being introduced. During the growth of a weld nugget initiated in this manner, the welding projection is also completely converted into the molten phase in this instance. However, it is now no longer possible to completely press the welding projection together as a result of the spacer according to the invention. Consequently, it is still possible for the connection faces to be moved toward each other only up to the time at which the spacer blocks further compression. As a result, it can consequently no longer be the case that the connection faces are located flat on each other. The spacer itself is not melted.

As a result of the readily achievable application of the welding projection against the other connection face, respectively, a sufficient electrically conductive contact is produced. In this instance, consequently, it is not necessary to arrange an auxiliary connection circuit, whereby the required process reliability is provided. Furthermore, the remaining adhesive gap between the connection faces is no longer produced in an uncontrolled manner. To this end, the initially produced spacing between the spacer and the connection face or connection faces should be defined by the configuration of the spacer. In this manner, the adhesive gap remaining during the connection process and in particular during the welding operation between the connection faces can be adjusted. The variable necessary for adjusting the adhesive gap is consequently the dimension by which the welding base projects above the spacer or the spacer falls below the height of the welding base. That dimension stands for the difference by which the connection faces can be further moved toward each other during the welding operation in the region of the welding base.

The arrangement of the welding base allows large electrodes to be used. Depending on requirements, there can also be used in this instance electrodes which are suitable as a result of their planar extent for welding two or more welding bases in a single operation. The method set out is also suitable for welding with electrodes applied at one side as a result of the pressing forces, which are only small, necessary for the application of the welding projection. Particularly during simultaneous welding of two or more welding bases, the necessary short-circuit of the welding current across the welding base can be brought about. The use of large, in particular flat, electrodes results in the advantageous side effect that the adhesive layer can be compressed in the adhesive gap between a plurality of welding bases during the welding process via the electrodes. A non-releasable connection which is process-reliable to a great extent is thereby produced. The use of large electrodes further brings about electrode wear which is only slight. Particularly in connection with high welding currents such as, for example, when welding components or component faces of aluminum, a long service-life thereof is produced when large electrodes are used as a result of the reduced wear.

By a suitable spacer being selected, the adhesive gap can now be selectively adjusted and in particular adapted to the requirements of the adhesive used.

The material used for the spacer may be a material which is electrically conductive or which is not electrically conductive. Preferably, the spacer is formed by an electrically conductive material or has at least one electrically conductive material. At the beginning of the welding process, the spacer does not have any physical contact with at least one of the connection faces. Consequently, the spacer is also not converted into a molten phase as a result of the electrically conductive contact which is consequently not present at the beginning of the welding process. A controlled stop of further approach movement of the connection faces is provided as a result of the solidity of the spacer, which solidity is consequently also present during the welding operation.

Furthermore, the welding operation can be simultaneously stopped when further approach movement of the connection faces is stopped. The cause of this is the instantaneous increase occurring at this time of the electrically conductive surface-area which is produced when the spacer contacts the connection faces. That surface-area comprises at that time at least a portion of the spacer and the welding base. As a result of the immediate increase in surface-area, the current density of the introduced welding current abruptly decreases so that the welding process is instantaneously interrupted.

In the context of the invention, it is conceivable for the welding base and/or the spacer to be present in the form of elements which are initially independent of the connection faces. Thus, for example, the welding base may be arranged on one of the connection faces via an adhesive, screw type, insertion type or welding connection in a materially engaging, positive-locking and/or non-positive-locking manner. In the case of an adhesive connection, the welding base may be arranged, for example, on one of the connection faces in the context of the application of the adhesive layer over that layer. The above-mentioned connection types apply accordingly to the arrangement of the spacer.

In an advantageous embodiment of the method according to the invention, there is provision for the welding base to be pressed as a protrusion out of the associated connection face. Alternatively or additionally, the spacer may also be pressed as a protrusion out of the associated connection face. The welding base and/or the spacer may thereby be a materially uniformly integral component of the components or component faces which are intended to be connected to each other.

The resultant advantage involves the extremely simple production of the welding base and/or the spacer. In particular thin-walled components or component faces have easy deformability in the present sense. Thus, the welding base and/or the spacer can advantageously be formed by a rear side of the component or component face as a bulge or protrusion which is directed therein, which rear side faces away from one of the connection faces, respectively. As a result, the part-region of the component or the component face displaced in this manner is positioned beyond the connection face as a welding base and/or as a spacer. Depending on the thickness of the material used in that part-region, extremely precise embodiments of the welding base and/or spacer can thus be produced.

As already set out above in connection with the arrangement of the welding base, the spacer can naturally also be applied to one of the connection faces together with the adhesive layer. In this instance, it would be conceivable to integrate the spacer in the mass of the adhesive, which mass is shapeless per se, which spacer is then arranged on the corresponding connection face at the same time as the application of the adhesive layer. However, the spacer may also be selectively arranged only after the adhesive layer has been applied. In this instance, the spacer remains at the necessary region of the connection face as a result of the adhesive properties of the adhesive layer.

In this manner, the spacer can be formed from a material which is different from the component or component region. In this instance, non-conductive materials would be conceivable, but also ones which are constructed, for example, in a resilient manner. In order nevertheless to obtain the necessary stop during the approach movement of the connection faces by means of the spacer constructed in this manner, the flexibility thereof can be adjusted, for example, progressively. The resistance thereof with respect to the resilient behavior thereof would thereby increase with increasing deformation until the approach movement is stopped. It would also be further conceivable to use an adhesive which is initially solid but which can be melted as a spacer. In this manner, an initial stop of the approach movement in question may be brought about during the welding process, wherein the spacer constructed in this manner can melt during a subsequent thermal processing operation. This is particularly advantageous when the adhesive layer used is hardened by such a thermal processing operation.

With regard to the position of the spacer and welding base relative to each other, a step of the invention makes provision for them to be able to be arranged with spacing from each other. It would thereby be possible substantially to ensure that the welding base which is converted into the molten phase does not have any influence on the spacer during the welding process. Thus, it is thereby possible to selectively prevent the spacer from also being converted at least partially into a molten phase during the welding process or at least from being weakened. Furthermore, as a result of the arrangement with spacing from each other, regions, which could otherwise undergo an excessively large approach movement of the connection faces, can be selectively supported between the connection faces by the spacer. Such embodiments may be necessary, for example, in spatially formed components or component faces in order to achieve a controlled end position of the connection regions relative to each other. A substantially uniform adhesive gap is thereby advantageously formed.

As a preferred alternative embodiment, the spacer and the welding base may naturally also be arranged together as a unit on one of the connection faces. The term "unit" in the context of the invention is intended to mean that the respective shapes and/or contours thereof merge into each other. In this instance, the particular advantage involves the simple common arrangement of the welding base and spacer in a single operation. Particularly when the welding base and spacer are pressed out of one of the connection faces, they can be produced together with a single shaping tool, in particular with a corresponding punching stamp. As a result of the immediate proximity of the spacer and welding base, a selective stop of the approach movement is further produced in an advantageous manner precisely at a location where an introduction of force occurs during the welding process. A process-reliable and precise formation of the adhesive gap which is intended to be adjusted by means of the spacer is thereby possible.

Depending on requirements and the embodiment of the components or component faces to be connected, a combination of the positional possibilities set out above in respect of the welding base and spacer relative to each other may also be advantageous. In this instance, the welding base and spacer would be arranged in some regions as a unit, while in other regions there would be a spacing of the welding base and spacer.

The above-explained method for the non-releasable connection of components or component regions is an extremely advantageous possibility for achieving precise adjustability of the adhesive gap in addition to a process-reliable connection. The arrangement of the spacer ensures that the otherwise inaccessible adhesive gap between the connection faces has precisely the extent which allows a maximum in terms of solidity for the planar adhesion by means of the adhesive layer. Therefore, pressing the connection faces against each other in a flat manner in the region of the welding base is a thing of the past. As a result of the substantially uniform configuration of the resultant adhesive gap, the risk that the connection may not be sufficiently durable in a constant manner as a result of an excessively small thickness or a non-existent thickness of the adhesive layer is eliminated.

The invention further provides for a non-releasable connection which is produced by the above-described method between two components or component regions. In this instance, two connection faces are welded to each other by resistance welding with an adhesive layer being incorporated via a welding base which is arranged on a connection face. A spacer is arranged between the connection faces according to the invention. In this instance, a significant aspect is the fact that the connection faces are spaced apart from each other in the region of the welding base. In other words, the connection faces also have between them, in the region of the welded welding base, an adhesive gap which substantially corresponds to the remaining adhesive gap in terms of the thickness thereof.

The resultant advantages have already been explained in the context of the method set out so that reference may be made at this point to the corresponding explanations within the present description. Furthermore, this also applies to the subsequent explanations in relation to the device-related portion of the invention.

In an advantageous development, there is provision for the welding base and/or the spacer to be pressed as a protrusion(s) out of the associated connection face. Naturally, the spacer and/or the welding base may also be an additional element which is not a materially uniformly integral component of the components or component faces which are intended to be connected. In this regard, in particular the spacer may be arranged as a separate element on one of the connection faces.

In the context of the invention, it is further envisaged that the spacer can be arranged with spacing from the welding base. In an alternative embodiment, the spacer and the welding base may be constructed as a unit.

The above-described method according to the invention for the non-releasable connection of components or component regions and the non-releasable connection according to the invention are not limited to the measures and embodiments disclosed herein but naturally also include additional measures and embodiments which have the same effect.

BRIEF DESCRIPTION OF THE DRAWINGS

FIG. 1 is a schematic cross-section of a method known in the prior art for resistance spot welding in the form of adhesive welding shortly before the introduction of the necessary welding current;

FIG. 2 shows in the same manner the resistance spot welding known in the prior art from FIG. 1 after the welding process has ended;

FIG. 3 shows in the same manner the result of the resistance spot welding known in the prior art from FIG. 2 shortly before carrying out additional resistance spot welding;

FIG. 4 shows in the same manner the result of the two resistance spot weldings known in the prior art from FIG. 3 after the welding process has ended;

Figure 5:
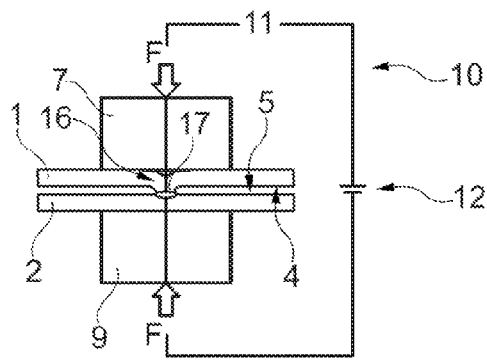
FIG. 5 is a schematic cross-section of a conventional projection welding method known in the prior art shortly before the introduction of the necessary welding current.

Additional advantageous details and effects of this disclosure are explained in greater detail below with reference to embodiments which are illustrated in the following Figures, in which:

FIG. 10 is a schematic plan view of a welding base in combination with a spacer according to the invention;

FIG. 11 is a cross-section of the combination of the welding base and spacer from FIG. 10;

FIG. 12 is a schematic cross-section of a method for connecting components or component faces using the combination from FIGS. 10 and 11 during the approach movement;

FIG. 13 shows in the same manner the result of the method from FIGS. 10 to 12 after the welding process has ended;

FIG. 14 is a schematic plan view of an alternative combination with respect to FIG. 10 comprising the welding base and the spacer;

FIG. 15 is a cross-section of the alternative combination of a welding base and spacer from FIG. 14;

FIG. 16 is a schematic cross-section of a method for connecting components or component faces using the combination from FIGS. 14 and 15 during the approach movement;

FIG. 17 shows in the same manner the result of the method from FIGS. 14 to 16 after the welding process has ended;

FIG. 18 shows in the same manner the result of the method from FIGS. 10 to 13 using a large electrode after the welding process has ended, and FIG. 19 is a plan view of a selection of schematically illustrated combinations of the welding base and spacer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The following descriptions in relation to FIGS. 1 to 9 relate to welding methods which are known from the prior art. The associated explanations serve to set out the associated disadvantages with regard to the connection of two components. It is thereby intended to provide a better understanding of the method according to the invention and the non-releasable connection according to the invention which can be produced in this manner.

FIG. 1 first shows the prior art for a known method for resistance spot welding in the form of adhesive welding. In this instance, a first component 1 and a second component 2 are intended to be welded to each other partially with an adhesive layer 3 being incorporated.

The adhesive layer 3 has previously been applied in a manner not illustrated in greater detail at least to a first connection face 4 of the first component 1 or to a second connection face 5 of the second component 2. Naturally, the adhesive layer 3 can also be applied to both connection faces 4, 5. Subsequently, the two components 1, 2 were positioned one on the other, as can be seen in FIG. 1 as a result. While the two connection faces 4, 5 were moved toward each other in a manner not illustrated, a planar contact of the adhesive layer 3 with respect thereto was able to be produced.

In order now to obtain a local welding location, a first electrode 7 is applied to a first rear side 6 of the first component 1 facing away from the first connection face 4 and a second electrode 9 is applied to a second rear side 8 of the first component 1 facing away from the second connection face 5. In this instance, the two electrodes 7, 9 are directly opposite each other. The electrodes 7, 9 are provided to conduct a welding current through the two components 1, 2. To this end, the two components 1, 2 are produced from an electrically conductive material. In order to be able to introduce the welding current via the electrodes 7, 9, the electrodes are connected to a circuit 10. For this purpose, the two electrodes 7, 9 are connected to a current source 12 via physical lines 11.

The actual welding operation is carried out via a short-circuit (not illustrated here) of the circuit 10. In this instance, the circuit 10 is opened, as illustrated by the indication of the lines 11 between the two electrodes 7, 9. The short-circuit and consequently the closure of the circuit 10 is brought about by the two connection faces 4, 5 being moved together as illustrated in FIG. 2 by means of the local compression thereof by means of the electrodes 7, 9 which move toward each other. This movement is carried out until the connection faces 4, 5 are partially located on each other and thus have a local, electrically conductive contact therebetween. High electrode forces F are necessary in order to displace the adhesive layer 3 in the region between the two electrodes 7, 9.

FIG. 2 shows the short-circuited state in which the welding current flows from one of the electrodes 7, 9 through the touching connection faces 4, 5 of the two components 1, 2 into one of the other electrodes 7, 9. There is thereby produced local heating, by means of which the touching connection faces 4, 5 are partially melted. After the welding current is switched off, the molten and subsequently cooling regions are converted into a materially uniform, materially engaging connection. A local welding connection 13 has thereby been produced between the two components 1, 2. As may be seen, the adhesive layer 3 has been almost completely displaced in the region of the welding connection 13. A type of crater is produced as a result of the resultant deformation of the components 1, 2 with respect to the adhesive layer 3 which remains in a surrounding manner so that the adhesive layer 3 tapers in a wedge-like manner toward the welding connection 13 in terms of the extent thereof.

FIG. 3 illustrates the components 1, 2 which are connected to each other by means of the welding connection 13 and the adhesive layer 3. Within the welding connection 13, a weld nugget 14 which is formed during the welding process is indicated as an oval. In this instance, an additional welding connection 13 is intended to be produced in the manner described above with spacing from the welding connection 13. Reference may be made to the explanations relating to FIGS. 1 and 2 with regard to the individual steps necessary for this.

FIG. 4 shows the result of two welding connections 13 which are spaced apart from each other. As a result of the above-described problems resulting from the displacement of the adhesive layer 3, this is now formed in a lozenge-like manner between the two welding connections 13. As a result, an adhesive gap 15 filled with the adhesive layer 3 in an extremely non-uniform manner in relation to the extent of the two connection faces 4, 5 relative to each other.

FIG. 5 now shows an arrangement with which a projection welding method can be carried out. Unlike the conventional resistance welding set out above, this is distinguished by the arrangement of a welding base 16. In this case, the welding base 16 may also be referred to as the welding projection. As can be seen, the welding base 16 is formed in this instance from the first component 1. To this end, the component 1 was partially positioned from the first rear side 6 thereof toward the first connection face 4 thereof. The welding base 16 allows simple, electrically conductive contact which is produced quasi per se via a tip 17 of the welding base 16. Consequently, the two components 1, 2 only have to be pressed against each other with substantially less electrode force F during the welding process. In this regard, substantially larger electrodes 7, 9 can also be used in comparison with conventional resistance welding because it is not necessary to introduce the electrode force F in a point-like manner.

Figure 6:
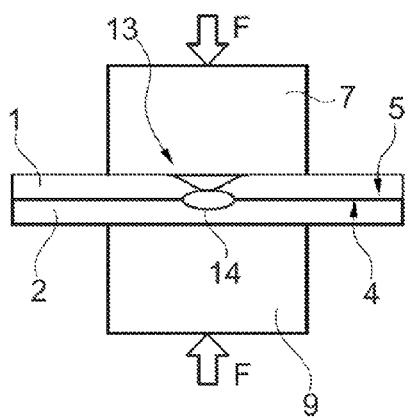
FIG. 6 shows in the same manner the result of the projection welding method known in the prior art from FIG. 5 after the welding process has ended.

FIG. 6 sets out the result of the welding process. By the welding current being introduced, the welding base 16 was converted into a molten phase in which the weld nugget 14 was formed. In this instance, however, the two components 1, 2 were moved together by means of the electrode force F to such an extent that they are now located one on the other with the connection faces 4, 5 thereof. The cause of this is the melting of the welding base 16 which was completely compressed.

Figure 7:
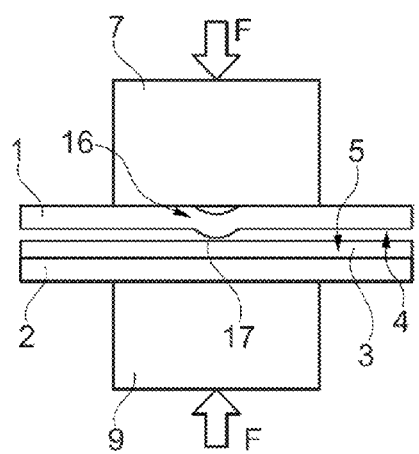
FIG. 7 is a schematic cross-section of a method known in the prior art for projection welding in the form of adhesive welding shortly before the components to be connected are moved together.

The combination of the projection welding method shown in FIGS. 5 and 6 with adhesive welding is now illustrated in FIG. 7. As can be seen, in addition to the arrangement of the welding base 16 on the first component 1, the adhesive layer 3 is now also applied to the second connection face 5 of the second component 2 for this purpose. The state shown constitutes the intact adhesive layer 3, wherein the two components 1, 2 are still spaced so far apart from each other that the tip 17 of the welding base 16 has not yet been introduced into the adhesive layer 3.

Figure 8:
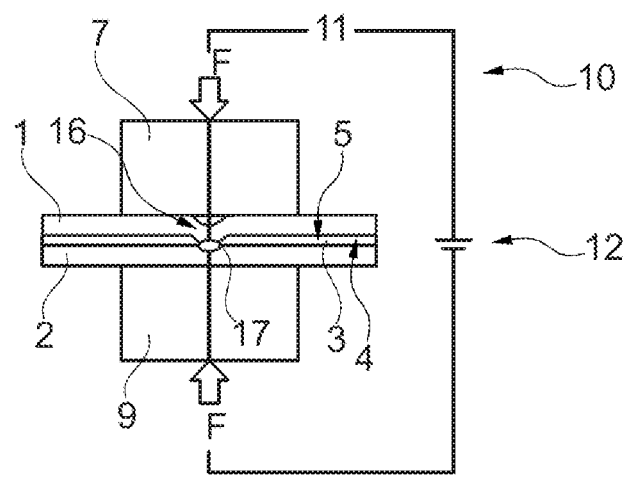
FIG. 8 is a cross-section of the method known in the prior art for adhesive welding from FIG. 7 shortly before the introduction of the necessary welding current.

FIG. 8 illustrates the first step of the approach movement of the two connection faces 4, 5 by means of the electrode force F. In this instance, the welding base 16 is urged with local displacement of the adhesive layer 3 through the layer until the tip 17 of the welding base 16 is applied against the second connection face 5 of the second component 2. From this time on, an electrically conductive contact is produced and the two connection faces 4, 5 are in planar contact with the adhesive layer 3. After the welding current has been introduced via the circuit 10, the conversion of the welding base 16 into a molten phase now begins in the manner already described. At the same time, the two connection faces 4, 5 are locally moved toward each other by means of the electrode force F in the region of the welding base 16.

Figure 9:
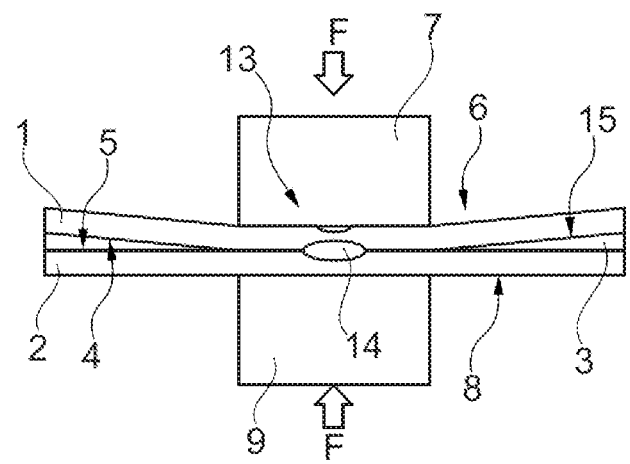
FIG. 9 shows in the same manner the result of the method known in the prior art for adhesive welding from FIGS. 7 and 8 after the welding process has ended.

The result of the welding process as illustrated in FIG. 9 shows that the two components 1, 2 are deformed in a crater-like manner similarly to in conventional resistance welding in the form of adhesive welding. Although a residual quantity of the adhesive layer 3 as far as the weld nugget 14 formed is sometimes still present, it is also displaced in this instance in a wedge-like manner toward the welding connection 13 produced.

Against this background, it is clear that the adhesive welding which is advantageous per se generally has disadvantages in terms of a selectively adjustable adhesive gap 15 being obtained. In particular as a result of the variable extents of the adhesive layer 3, there may be produced in this instance regions which do not have a sufficiently durable connection by means of the adhesive layer 3. The following description regarding FIGS. 10 to 19 serves to explain the present.

FIG. 10 is a plan view of an embodiment according to the invention in the region of the welding connection to be produced as a cut-out using the example of the component 1. By viewing the first connection face 4, it is possible to see the arrangement of the welding base 16 as already known in the prior art. In this instance, the arrangement has an elongate configuration which extends in a bar-like manner over a partial region of the connection face 4. According to the invention, a spacer 18 is further arranged on the connection face 4. In this instance, the spacer 18 also has an elongate configuration which extends in a bar-like manner over a partial region of the connection face 4. In this instance, the welding base 16 and spacer 18 are orientated relative to each other so that they intersect with each other. In this case, the welding base 16 and spacer 18 together form an angle w which is 90° in this instance. As already indicated here, the welding base 16 projects above the spacer 18, which is again better illustrated in FIG. 11.

FIG. 11 illustrates the arrangement according to the invention of the welding base 16 and spacer 18 from FIG. 10 as a longitudinal section of the first component 1 through the spacer 18. As already mentioned, the welding base 16 projects above the spacer 18. In this instance, the tip 17 of the welding base 16 directed downward in FIG. 11 is spaced apart from the first connection face 4 at a spacing x1. However, an upper region 19 of the spacer 18 is spaced apart from the first connection face 4 at a spacing x2. As can be seen, the spacing x1 of the tip 17 from the first connection face 4 is greater than the spacing x2 of the upper region 19 from the first connection face 4. The term "projecting above" is intended in accordance with the invention to mean precisely that relationship of the two above-mentioned spacings x1, x2.

FIG. 12 again shows, from FIG. 11, the first component 1 which is prefabricated according to the invention and which is now intended to be connected to the second component 2 with the adhesive layer 3 being incorporated. The illustration substantially corresponds to the state already shown in FIG. 8, according to which the tip 17 of the welding base 16 abuts a partial region of the second connection face 5 of the second component 2 with local displacement of the adhesive layer 3. Subsequently, the welding current is introduced in a manner not shown via the circuit 10 and in particular via the two electrodes 7, 9. As already described in the previous contexts, the welding base 16 is converted in this case into a molten phase beginning at the tip 17 thereof. At the same time, the electrodes are moved toward each other in a manner not shown by means of the electrode force F so that the two connection faces 4, 5 are moved nearer each other. The approach movement is carried out until the first component 1 abuts a partial region of the second connection face 5 of the second component 2 by means of the spacer 18, as can be seen in FIG. 13.

FIG. 13 shows the result of the method according to the invention, according to which the welding connection 13 was produced with the weld nugget 14 being formed in addition to the adhesive connection by means of the adhesive layer 3. The uniform formation of the welding gap between the connection faces 4, 5 can clearly be seen. The adhesive layer 3 thereby has a substantially uniform extent. In this instance, the adhesive layer 3 extends as far as the welding connection 13 without a wedge-like tapering having been formed by local deformation of one of the components 1, 2.

FIG. 14 shows an alternative embodiment or arrangement of the welding base 16 and spacer 18 relative to each other as a plan view of the first connection face 4 of the first component 1. Unlike the configuration of FIG. 10, they are not arranged in this instance at an angle w but instead extend parallel with each other. In the parallel arrangement thereof, the welding base 16 and spacer 18 are spaced apart from each other. In this instance, the welding base 16 and spacer 18 are also constructed in a bar-like manner. With regard to the illustration of FIG. 14, the welding base 16 is arranged in this instance on the right while the spacer 18 is located to the left of the welding base 16.

FIG. 15 shows the alternative arrangement of the welding base 16 and spacer 18 of FIG. 14 as a section through it and the first component 1. As can be seen, the welding base 16 also projects above the spacer 18 in this instance. As already set out in relation to FIG. 11, the upper region 19 of the spacer 18 is also spaced apart here from the first connection face 4 of the first component 1 at a spacing x2 which is smaller than the spacing x1 of the tip 17 of the welding base 16 from the first connection face 4.

FIG. 16 shows the state of the welding base 16 which is applied with the tip 17 thereof to a partial region of the second connection face 5 of the second component 2. This state corresponds to an extremely great extent to the illustration in FIG. 12, only with the alternative arrangement of the welding base 16 and spacer 18. In this instance, it is also possible to clearly see that the electrically conductive contact necessary for the subsequent welding process is provided only by means of the tip 17 of the welding base 16 while the spacer 18 is initially spaced apart with the upper region 19 thereof from the second connection face 5.

FIG. 17 shows the result of the welding process which substantially corresponds to the result in FIG. 13. The approach movement of the two connection faces 4, 5 was also stopped in this instance by the arrangement of the spacer 18, wherein the welding connection 13 is formed in the region of the welding base 16. As can be seen, the remaining residual quantity of welding base 16 can be adjusted by means of the difference between the two spacings x1, x2 thereof with respect to the first connection face 4. Thus, a specific portion of the welding base 16 is left in this instance so as to form the weld nugget 14. However, the welding base 16 in FIG. 13 is almost completely compressed.

FIG. 18 shows a larger arrangement of two components 1, 2 which are connected to each other and which have been welded by means of a total of four welding connections 13 in this instance. In this instance, the welding process is illustrated at a time at which the two connection faces 4, 5 have already been moved toward each other, the approach movement has been stopped and the weld nuggets 14 are formed. This schematic illustration is intended to illustrate the advantage of the method according to the invention in conjunction with a large first electrode 7, in particular with the electrode force F being introduced at one side.

As can be seen, the second electrode 9 is reduced in this instance to a small partial region between two welding connections 13, wherein it takes up only a contact closure and not the function of a counter-bearing with respect to the electrode force F of the first electrode 7. For this purpose, the two components 1, 2 are supported at the end regions thereof by means of suitable bearings 20 which apply necessary reaction forces F/2 to the electrode force F in order to produce a static equilibrium. As a result of the first electrode 7 which spans at least two welding connections 13, those connections were able to be produced within a single operation by the welding current being able to flow between the electrodes 7, 9 via the circuit 10. As a result of the extent of the first electrode 7, it was further also possible to compress a number of partial regions of the adhesive layer 3 between the welding connections 13 in an advantageous manner. An extremely precise adhesive gap 15 was thereby able to be formed between the connection faces 4, 5.

FIG. 19 shows various alternative embodiments of the arrangement according to the invention of the welding base 16 and spacer 18 as a schematic plan view. In this instance, a total of four construction variants are shown at the same time. The arrangement possibilities are not reduced to those shown here but instead also comprise other advantageous forms which are consequently equivalent.

With reference to the illustration of FIG. 19, there is shown on the very left a variant which has already been described in connection with FIGS. 10 to 13. In this instance, the welding base 16 and spacer 18 intersect, wherein they together define the angle w. That angle is also 90° in this instance, as already shown in FIG. 10.

There is shown on the right beside the intersecting embodiment a variant in which the welding base 16 has been constructed as a bar as above. However, the spacer 18 has a point-like configuration. The diameter of the spacer 18 substantially corresponds in this instance to the cross-sectional width of the bar-like welding base 16. In this embodiment, a total of two spacers 18 are further combined with a welding base 16. In this instance, the point-like spacers 18 are arranged beside the longitudinal sides of the bar-like welding base 16 with spacing therefrom. The position thereof is a mirror-image in relation to the longitudinal direction of the bar-like welding base 16.

Furthermore, on the right beside the above-described embodiment, the parallel arrangement of the welding base 16 and spacer 18 appears again, as already shown in FIGS. 14 to 17.

On the very right in FIG. 19, there is illustrated an embodiment which comprises two welding bases 16 and two spacers 18. They are arranged around a notional center and curved around that center in a planar manner. In this manner, the spacers 18 and welding bases 16 together form a circular arrangement which is interrupted at the changes between the spacers 18 and welding bases 16. The spacers 18 and welding bases 16 alternate with each other in the peripheral direction of that circular arrangement.

LIST OF REFERENCE NUMERALS

1 First component
2 Second component
3 Adhesive layer between 1 and 2
4 First connection face of 1
5 Second connection face of 2
6 First rear side of 1
7 First electrode
8 Second rear side of 2
9 Second electrode
10 Circuit
11 Line of 10
12 Current source of 10
13 Welding connection between 1 and 2
14 Weld nugget of 13
15 Adhesive gap between 4 and 5
16 Welding base
17 Tip of 16
18 Spacer
19 Upper region of 18
20 Bearing
F Electrode force
F/2 Reaction force
w Angle between 16 and 18
x1 Spacing between 17 and 4
x2 Spacing between 19 and 4

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method for non-releasably connecting components or component regions, wherein two connection faces are partially welded to each other and are bonded with an adhesive layer, the method comprising:
   forming a welding base on one of the connection faces;
   forming a spacer on one of the connection faces at a location spaced from the welding base, wherein the welding base projects above the spacer, and wherein the steps of forming the welding base and the spacer are performed by pressing protrusions out of the associated connection face;
   applying the adhesive layer on one of the connection faces,
   moving the connection faces toward each other to press the welding base against the connection face that does not include the welding base, and
   supplying welding current through the welding base to melt the welding base until the spacer stops the connection faces from moving toward each other.

2. The method as claimed in claim 1, wherein the spacer is applied to one of the connection faces together with the adhesive layer.

3. A method of welding two components together comprising:
   providing a welding base on one component;
   providing a spacer on one component spaced from the welding base, wherein the welding base projects above the spacer, and wherein the steps of providing the welding base and the spacer are performed by pressing protrusions out of the associated connection face;
   applying an adhesive between the two components;
   connecting the two components through the welding base; and
   supplying welding current through the components and the welding base to melt the welding base until the spacer is in contact with both components.

4. The method of claim 3, wherein a gap is defined between the spacer and one of the components, and wherein melting the welding base reduces the thickness of the welding base until the spacer closes the gap and comes into contact with both of the components.

5. The method of claim 4, wherein when the spacer comes into contact with both of the components an adhesive gap is defined between the two components by the spacer.

6. The method of claim 4, wherein the step of supplying welding current is interrupted when the spacer closes the gap by coming into contact with both of the components.

7. The method of claim 3 wherein the welding base has a first thickness and the spacer has a second thickness that is less than the first thickness, and wherein the step of supplying the welding current begins after the welding base engages the second component and the step of supplying the weld current ends when the spacer comes into contact with both of the components.

* * * * *